United States Patent [19]

Yananton

[11] Patent Number: 5,025,752
[45] Date of Patent: * Jun. 25, 1991

[54] NON-ABSORBENT LITTER FOR USE WITH ABSORBENT PAD

[76] Inventor: Patrick Yananton, 1518 Little Hill Rd., Point Pleasant, N.J. 08742

[*] Notice: The portion of the term of this patent subsequent to Sep. 4, 2001 has been disclaimed.

[21] Appl. No.: 224,944

[22] Filed: Jul. 27, 1988

Related U.S. Application Data

[63] Continuation of Ser. No. 885,932, Jul. 15, 1986, abandoned, which is a continuation-in-part of Ser. No. 573,958, Jan. 26, 1984, Pat. No. 4,460,225, which is a continuation-in-part of Ser. No. 315,507, Oct. 27, 1981, Pat. No. 4,469,046.

[51] Int. Cl.⁵ .............................................. A01K 45/00
[52] U.S. Cl. .................................... 119/169; 119/171
[58] Field of Search ............................................ 119/1

[56] References Cited

U.S. PATENT DOCUMENTS

| 4,469,046 | 9/1984 | Yananton | 119/1 |
| 4,640,225 | 2/1987 | Yananton | 119/1 |
| 4,756,273 | 7/1988 | Yananton | 119/1 |
| 4,774,907 | 10/1988 | Yananton | 119/1 |
| 4,800,841 | 1/1989 | Yananton | 119/1 |
| 4,840,140 | 6/1989 | Yananton | 119/1 |
| 4,848,274 | 7/1989 | Yananton | 119/1 |
| 4,852,518 | 8/1989 | Yananton | 119/1 |
| 4,869,204 | 9/1989 | Yananton | 119/1 |

Primary Examiner—David A. Scherbel
Assistant Examiner—Creighton Smith
Attorney, Agent, or Firm—Sheldon H. Parker

[57] ABSTRACT

The invention relates to the prevention of the odor caused by the action of bacteria on cat urine in a cat litter box. The cat liter box has a base and walls and is provided with a sorbtive-desiccant member for the collection of animal urine. Litter is in direct moisture transfer contact with the sorbtive-desiccant member. The odor prevention process includes the steps of transferring cat urine directly from granular particles, to the sorbtive-desiccant member, sorbing the urine in a sorbtive-desiccant member having high surface area and high urine sorbency, dispensing the urine quickly in said sorbtive-desiccant member, and evaporating said urine from said high surface area sorbtive-desiccant member through the granular particles. The sorbtive-desiccant member maintains the urine in a medium which subjects the bacteria in the urine to the effects of drying. The granular particles are non-absorbent particles having sufficiently large diameter to provide sufficient interparticle spacing to permit free flow of urine from the particles to the sorbtive-desiccant member and the free flow of moisture from said sorbtive-desiccant member to the air. The base of the litter box prevents urine from leaving one side of said sorbtive-desiccant member. Thereby the bacteria, which are capable of breaking down cat urine, die or become dormant and thus prevent significant odor formation.

20 Claims, 2 Drawing Sheets

NON-ABSORBENT LITTER FOR USE WITH ABSORBENT PAD

CROSS-REFERENCE TO RELATED APPLICATIONS

This application is a continuation of patent application Ser. No. 06/885,922, filed Jul. 15, 1986, now abandoned which application is a continuation-in-part of copending patent application Ser. No. 573,958, filed Jan. 26, 1984, U.S. Pat. No. 4,460,225, which application is a continuation-in-part of application Ser. No. 315,507 filed Oct. 27, 1981, U.S. Pat. No. 4,469,046.

BACKGROUND OF THE INVENTION

1. Field of the Invention

This invention relates to a specific non-absorbent litter for use in combination with an absorbent medium for odor prevention in animal litter units. In particular the litter can be a mineral particle, such as coarse sand, and the absorbent pad can be a disposable, sorbent/desiccant pad-liner system.

2. Brief Description of the Prior Art

Many domestic animals frequently use litter boxes for the elimination of body wastes. The boxes are usually filled with various kinds of granular materials such as sand, cat litter and the like, and must be periodically emptied and cleaned, which are somewhat objectionable tasks, since the abosrbent granular material must be replaced and the boxes cleaned each time.

Cats, being the most frequent users of litter boxes, present a further problem in that the urine of the feline contains the highest content of urea which, when allowed to stand for any length of time in any sorbent material, releases an ammonia odor. This odor is one of the more objectionable factors in the ownership of a cat.

In order to eliminate the odor caused by cat urine, the litter box must be changed frequently, necessitating the expensive, laborious and unpleasant chore.

SUMMARY OF THE INVENTION

In accordance with the instant invention the foregoing problems are overcome and an easy to use, odorless, disposable sorbent pad system is provided. It has now been found that the efficacy of the disposable sorbent system can be optimized if the absorbence of urine in the litter is minimized and evaporation from the system is maximized. Non-absorbent mineral particles allow for the rapid entrance of the cat urine into the sorbent pad. The sorbent pad, can be constructed from high wicking capability materials. The formation of the odor associated with cat litter boxes is prevented by drying, thus inhibiting the bacterial action on cat urine. The cat urine is transferred directly from overlying litter particles, through a cat claw resistant screen into a sorbtive-desiccant member of fibers and having high surface area and high urine sorbency. The urine disperses quickly from fiber to fiber in the sorbtive-desiccant member. The moisture impermeable sheet prevents urine from leaving the side of the sorbtive-desiccant member opposite the screen. The screen and the fibers of the sorbtive-desiccant member provide for transport of moisture, aiding the drying process of the urine, thus inhibiting the growth and bacterial action of bacteria. Consequently, the bacteria die or become dormant thereby preventing significant odor formation.

BRIEF DESCRIPTION OF THE DRAWINGS

The advantages and objects of the invention will become apparent and the invention will be more fully understood from the following specification, particularly when read in conjunction with the drawings, wherein.

DETAILED DESCRIPTION OF THE INVENTION

Figure 1:
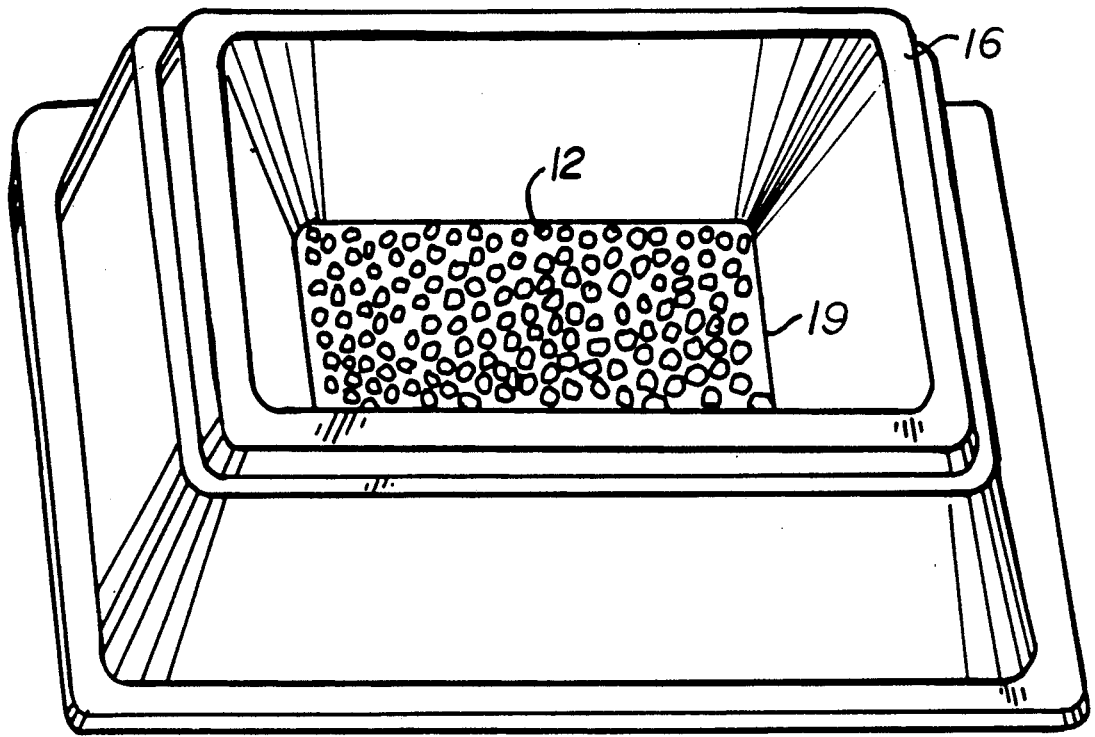
FIG. 1 is a top perspective of the assembled unit in accordance with the present invention.

In order to provide a clear understanding of the instant invention, the various aspects of the invention are hereinafter described in detail.

The sorbent pad structure of the instant invention can include a protective screening and a moisture impermeable liner. The protective screening is fully disclosed in copending patent application Ser. No. 573,958 filed Jan. 26,1984, now issued as U.S. Pat. No. 4,640,225, the disclosure of which is incorporated herein by reference thereto, as though disclosed herein in detail. The screen must be capable of withstanding the clawing action of an animal such as a cat, thus protecting the sorbent pad and the moisture impermeable liner. The holes in the screen are sized small enough to prevent the animal's claws from reaching the sorbent pad, while numerous and large enough to allow for air passage and rapid evaporation of liquids. The sorbent pad, constructed from high wicking capability materials, is positioned between the screen and the moisture impermeable material. The screen is sealed to moisture impermeable material along at least a substantial portion of their peripheral edges. The screen is a flexible member formed of strands bonded at their intersections and is formed of a material which is substantially inert to urine.

The formation of the odor associated with cat litter boxes is prevented by inhibiting the bacterial action on cat urine. A sorbent pad structure is positioned between a protective screening, capable of withstanding the clawing action of a cat, and a moisture impermeable liner. The cat urine is transferred directly from overlying litter particles, through a cat claw resistant screen into a sorbtive-desiccant member of fibers and having high surface area and high urine sorbency. The urine disperses quickly from fiber to fiber in the sorbtive-desiccant member. The moisture impermeable sheet prevents urine from leaving the side of the sorbtive-desiccant member opposite the screen. The screen and the fibers of the sorbtive-desiccant member provide for aeration, thus inhibiting the growth and bacterial action of bacteria as well as aid the evaporation of the urine from the sorbtive-desiccant member. Consequently, the bacteria die or become dormant, thereby preventing significant odor formation.

Cat urine is normally sterile, that is, free of bacteria which acts on the urine and produces the odor associated with cat urine. Nevertheless, it has been found that if steps are taken to inhibit the growth of, or cause the death of bacteria, odor formation can be prevented. It is presumed that the bacteria present in the fecal excreta, or present in the litter or air borne bacteria comes into contact with the urine, thereby producing an odor problem.

In accordance with the present invention steps are taken to prevent odor by killing the bacteria or inhibiting their growth, without having to resort to the use of bactericides.

Of all the various factors that influence the growth of microorganisms, water may be considered to be the most important. Indeed, water may really be considered a nutrient since it forms the bulk of the cellular substance. Compared to higher organisms, which regulate their water content to some extent, microorganisms are dependent upon the amount of water in the environment. For growth and multiplication bacteria require high concentrations of water in their immediate environment. In spite of their seemingly solid character and dry appearance, agar media and other solid foods used for the cultivation of bacteria require high concentrations of water as part of their composition. When organisms are grown on surfaces such as an agar plate, high humidity can provide conditions favorable to the development of microorganisms. Water acts as a solvent, and most metabolic activities are conducted within an aqueous environment in the cell. Water also serves as a catalyst by aiding or actually entering into many enzyumatic reactions. Turgidity of the cell is dependent upon the presence of water. In turn, turgidity is affected by the surface tension (osmotic tension) of the medium in which the organisms are suspended. It probably would be correct to condiser all bacteria as aquatic organisms.

Water is necessary for the existence and viability of microorganisms. The effects of desiccation on the viability of microorganisms provides a good example of the importance of water. Slow desiccation in the presence of air is most detrimental. Although many species of microorganisms can survive complete drying or desiccation for long periods, they do not grow under such conditions. In a state of complete desiccation the metabolic processes must stop almost completely since these depend largely on osmosis, diffusion, ionization and the colloidal state, all of which are dependent in turn on hydration.

GRANULAR MATERIAL

Mineral particles such as small pebbles, rocks, stones gravel, coarse sand and the like previously unsuitable as a cat litter material because of the lack of absorbency or their ability to hold urine that pools in the bottom of the litter box can now be used as a more effective cat litter box filler when used with absorbent pads. Because of their inherent ability to allow urine to rapidly drain into the absorbent pad without impeding the flow or spread of the urine through out the pad and allowing for a more rapid evaporation of the urine back through the particles and through out the absorbent pad due to the more numerous air spaces between these larger particles. Very fine particle such as fine sand or soil, will not act a a good cat box filler because of the flow of urine into the pad is impeded by the numerous particles. The transmission of the water vapor through these particles is also impeded.

The granular material as employed in the instant invention is utilized to satisfy the digging instinct of the animal and therefore need not provide absorptive qualities. Consequently, inexpensive non-abosrbent materials, including naturally occurring materials such as coarse sand and gravel, or synthetic materials such as glass and polymer beads, can be used in accordance with individual preferences. Unlike the commonly employed systems in which the granular material must be used in quantitiy to provide the required absorptive qualities and digging qualities, minimal quantities of the granular material can be used, as described herein. The absorption quality of the layer 24 can provide the total or the predominant desiccation effect.

Hence, proper sized non-abosrbent mineral particle cat box filler serves the function of acting as;

1. An attractive digging medium for cats
2. Allows cat urine to fall rapidly over the particles into the absorbent pad.
3. Allows cat urine to migrate rapidly within the pad since it is not drawn up and trapped on absorbent particles lining the interface of the cat litter-rip proof layer.
4. Rapid migration of urine within the pad allows for more rapid evaporation of the pad.
5. Water vapor can escape up through the pad, through the mineral litter particles.
6. In addition to evaporation from the absorbent pad, the mineral particles wet by the void will dry and hence the effective surface area producing evaporation is greater for the combination of the pad with wetable non-absorbent particles than with the abosorbent particles and absorbent pad.
7. Mineral particles wet by the previous void will become dry due to both drainage and evaporation and thus the surface area of the non-absorbent particles available for aiding in evaporation is maintained at a maximum value. (By way of contrast, absorbent litter particles stay wet and lose their ability to function as an absorbent and an evaporation surface.)
8. The heavy mineral particles scatter out of the litter box less than light weight clays and similar abosrbent litters.
9. The washed mineral particles contain less dust than clay and is not friable therefor creates no dust of its own.

Figure 3:
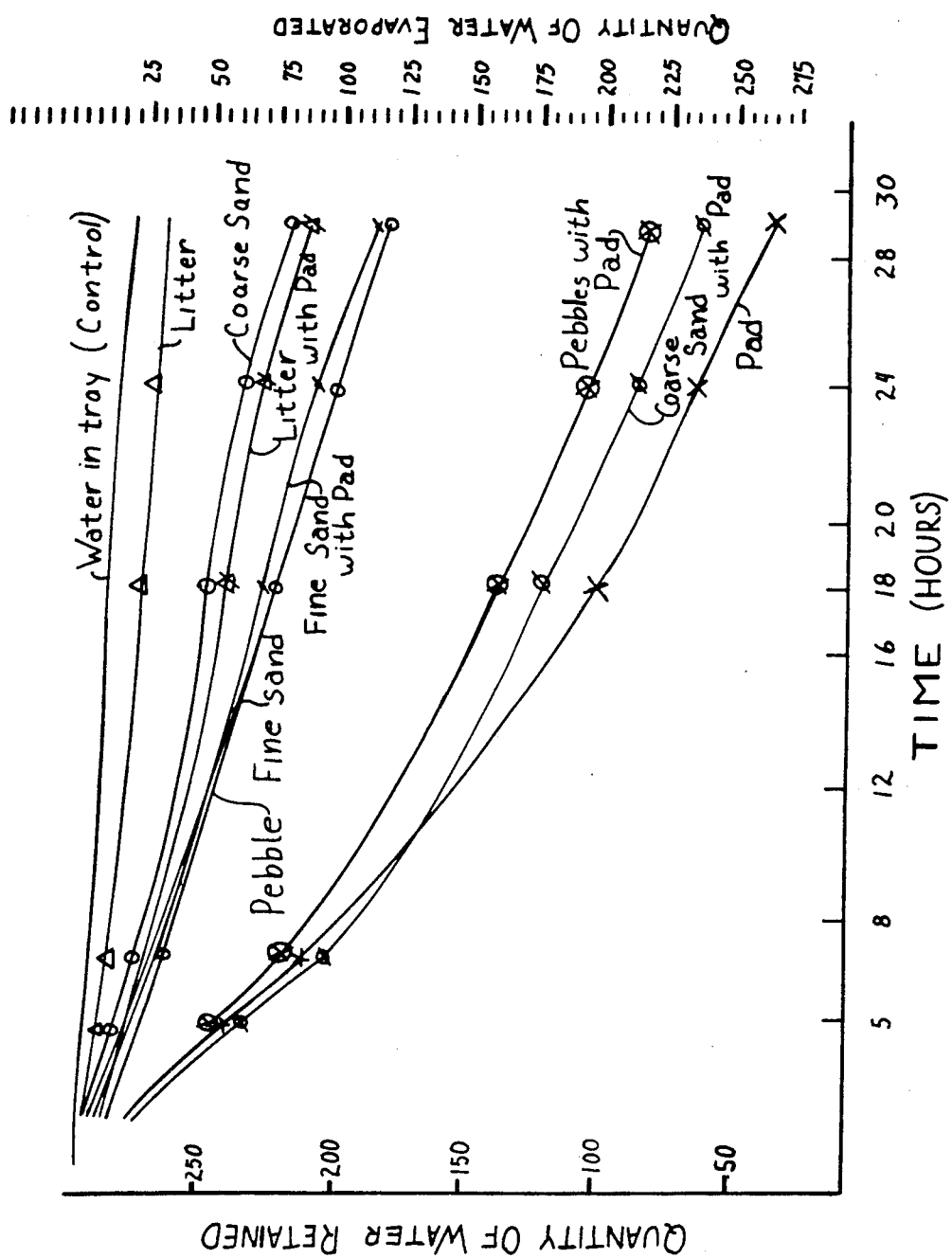
FIG. 3 is a graph which compares evaporation rate for several material and plots time versus quantity of water evaporated and retained.

The litter material is commonly in granular form and must be in moisture transfer contact with the underlying sorbent material so that the urine can be drawn from the litter material into the sorptive layers. The use of a surfactant on the screen material can enhance the moisture transfer capability of the screen and is essential in combination with hydrophobic or low hydrophilicity screen materials. The particle size distribution can range from a few millimeters to several centimeters. Fine sand having a particle size at the lower end of sands, that is at the 200 mesh (0.074 mm) size pack so densely as to limit or restrict liquid and air flow between the particles. At the upper end of the particle size the sand or gravel material can be rejected by the cats and fail to enhance the distribution of the liquid across the absorbent pad, as evident from the test and the graph of FIG. 3.

While reference has been made in particular to sand, it should be understood that non-absorbent materials, in particular other inorganic minerals, in general will provide similar results.

Particularly suited to the instant invention is a coarse sand referred to as fine gravel commonly found in central New Jersey. These gravels and sands were deposited during the formation of the early coastal plain. The sands and gravels consist mostly of quartz or silica. The available particles are found in a wide range of particle sizes and must be sieved to obtain the desired particle size distribution. The non-absorbent particles must be sufficiently free of friable materials, such as clay, in order to avoid the filling of the interstices. The particle can be as small as one millimeter in diameter and as large as three centimeters. The preferred range, however, is between two millimeters and about one centimeter. It should be understood that the particles typically are not round, but rather, most typically are oval or irregular in shape and the diameter referred to is the average diameter of the particle. The particles are washed to get rid of the small dust particles and then air or oven dried prior to use as a non-absorbent litter.

For aesthetic effect; the particles can be dyed to a particular color. Mordant dyes can be used where the particles are silica. The particles can be coated to moderate the hydrophobicity or hydrophilicity of the surface of the particles. The use of waxes, silicons, and the like can be used in this regard.

Although glass beads, Teflon coated particles, polypropylene or polyethylene, synthetic and natural resins can serve as the same function as non-absorbent coarse sand or fine gravel, a large number of cats will reject the use of these products as a cat box filler. Very large particles such as large pebbles or gravel, rocks, etc., tend to be very heavy and easily packed when used as a cat box filler and also can be rejected by cats. Digging is difficult with large heavy particles and can also lead to rejection by cats. The coarse sand, on the other hand, mimics the appearance of the commercially available absorbent clay litters, is readily used by the cat for digging and as a waste matter repository and has the further advantage of resisting scattering and tracking by the cat. In addition, the non-absorbent granules are non friable and dusting is consequently negated.

ABSORBENT UNIT

The absorptive elements can be any material such as paper, tissue, pulp starch and related polymers, etc. which can disperse the liquid quickly, thus providing a large surface area for evaporation of moisture. In order to maintain a moisture free environment, it is necessary to evaporate from 5 to 20 ml. of liquid each time the system is used by the cat.

Examples of sorbent materials are those manufactured by Dow Chemical and marketed under U.S. Pat. No. 4,117,184. The instant patent application incorporates by reference thereto, as though set forth in detail herein the description in U.S. Pat. No. 4,117,184 of a product commonly identified as a super absorbent and sold by Dow Chemical Company under the designation DWAL 35 R.

Alternatively, the super sorbent can be a material such as the National Starch and Chemical Corporation sold under the registered trademark PERMASORB. The National Starch product is a hydrophilic polymer which has the ability to absorb and hold urine. There is a significant reduction in urine odor and pH level in the presence of PERMASORB.

Another example of an absorbent is the material sold under the trademark WATER-LOCK by Grain Processing Corp.

In contrast to the ultra-high absorbency materials, ground paper pulp absorptive material has been found to provide a combination of high absorbency, high surface area and low cost. The large surface area provides for rapid urine evaporation and consequently is extremely effective in odor prevention.

Toxic chemicals or biologically active ingredients are not only unnecessary but preferably are avoided. U.S. Pat. No. 4,494,482 assigned to Proctor and Gamble relies on the use of 5000 to 30,000 ppm of a halogenated aromatic hydrocarbon bacteriostat in an sorbent pad to effectively control odor development. It has been found that if the sorbent material has the ability to absorb the urine, distribute the urine rapidly throughout its mass, and evaporate the urine faster than the bacteria can act on the urine, then the additives are not only unnecessary but undesirable.

Bacteria from the feces cannot grow in the abosrptive layer because they are dried out and die or become dormant. It is the bacteria which is capable of breaking down the urine which cause the strong volatile odor commonly associated with cat litter boxes, the dry environment of the sorbent material effectively prevents odor. The high absorption capacity of the super absorbent polymers, such as available from Dow Chemical, do not provide an advantage over a pulp fiber, due to the high rate of evaporation of urine from the fiberous material. As previously stated, the instant invention requires substantially less granular material for each use and requires fewer changes, saving further on granular use. In the prior art type of litter box, the litter comsumption is greater than in accordance with the present invention.

The amount of litter which is used can be decreased with time in order to permit the cat to become accustomed to the low litter level. In some cases, cats can be trained to the pads without litter. Whereas, in conventional litter boxes, two to three inches of litter are required, in accordance with the present invention less than one inch of litter, and preferably no more than about one half inch, provides the desired results, as evident from the following chart.

It hsa been found that the use of over an inch of an absorbent litter can actually retard the moisture evaporation, apparently due to the litter serving as a moisture barrier between the sorbent unit and the atmosphere. In actual use it has been found that the clawing and scratching of the cats tends to expose regions of the screen or at least greatly reduce the amount of litter covering certain regions of the screen. Although the ideal system would be free of litter the cats tend to reject a litter container which is totally litter free. The use of a non-absorbent litter which does not pack, or conversely, which permits the sorbent unit to "breath" minimizes the adverse effects of standard litters.

FIG. 1 illustrates the assembled unit 10 of the instant invention. The granular material 20 is placed on top of the sorbent unit 12 to provide the animal with the necessary scratching materials, if so required. The granular material would not be required if the unit was being used for a dog or other animal which did not have the scratching instinct.

The sorbent unit can be used with standard litter boxes and can be combined with the adhesive securing means, elasticised securing means or any other method disclosed in copending applications.

Figure 2:
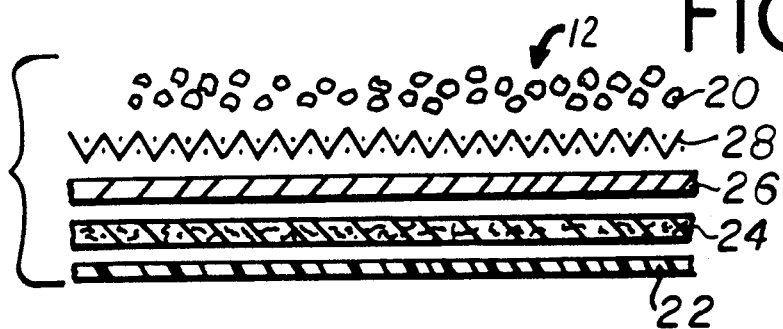
FIG. 2 is an exploded fragmentary view of the sorbent pad of the instant invention.

FIG. 2 shows, in exploded form, a cross-section of the layers which form the sorbent unit 12. The outer layer 22 which is a thin plastic sheet of a material such a polypropylene or polyethylene prevents waste from making contact with the box and can double as a bag when disposing of the soiled litter.

A protective layer 26, which can be used, if desired, is made from a durable, non-woven tissue substance. If a binder is used for either the fabric of the tissue layer or other layer, it must be of a non-water soluble material. The protective screen 28 is of a flexible, durable substance which prevents the animal from scratching through to the bottom layers. The granular material 20 is placed on top of the sorbent unit as previously described herein.

Urine evaporation tests were conducted for the purpose of comparing the evaporation rates of a variety of materials. In one instance the quantity of water was contained in a bowl having an eight inch diameter. In all instances 9 milliliters of liquid were tested since this represents the average amount of urine deposited on a litter pad by a cat each time it uses a pad. Quite obviously a young kitten will pass less liquid than a large adult cat. Statistically it has been determined that cats will void once every four hours and the quantity of liquid will be about 9 milliliters. In the event that the rate of evaporation of the urine is slower than the rate of deposit of urine in the pad, the pad will never reach a dry state and the odor associated with bacterial action on urine can not be prevented. It should be noted that a four hour time limit is beyond the maximum time permitted for the evaporation of urine particularly if the litter box is used by more than one cat. It has been found that if the urine is not evaporated within a short period of time that the bacteria have sufficient time to attack the urine and begin the odor problem. Quite obviously this time factor will tend to be shorter on a warm day than on a cold day, due to the temperature dependency of the bacterial action.

Ordinarily, in cat boxes, the greater the quantity of litter the less is the odor. However, in this system the use of less litter is best since the drier the environment the less favorable are the conditions for the growth of bacteria and conventional litters tend to retard the loss of moisture. Thus, while the recommended depth of litter is two to three inches, in the instant system the use of about one half to one inch of litter is preferred.

The loft or density of the absorbent material is seen to have an effect on the evaporation rate since a relatively high loft fibrous mass provides for better aeration and evaporation. Whereas a low loft (highly compacted) absorbent tends to restrict the essential air flow, the greatest benefit is attained with a high loft material. The superabsorbents, of course, are extreme examples of a highly compacted absorbent which has much less surface area per ounce than the high loft fiberous absorbent.

It is noted that in sorbent pads, such as those used as disposable diapers for children or as incontinence pads for adults, evaporation is not a factor of concern since the pad traps the urine and holds it between a moisture impermeable liner and body of the user. The factors which are critical in human applications are liquid absorption and wicking effects only.

Evaporation rate maximization can be achieved, in part, if the urine travel within the pad is maximized; that is the wicking effect of the sorbent medium should be such that the urine distributes rapidly across the surface of the pad 24 thus maximizing the surface area of the urine exposed to the atmosphere. In this regard it is noted that short fibers will have a larger surface area than long fibers, but long fibers optimize the wicking effect of the sorbent pad.

One of the major drawbacks of the conventional litter used in cat litter boxes is that the litter tends to retain the urine and retard urine evaporation. Similarly, the so called 'super sorbent' materials, such as Dow Water Absorbent Laminate grade DWAL35R sold by Dow under the trademark DWAL, have an extremely high ratio of liquid sorbents to material mass, causing the material to retain urine or other liquids and stay wet for a long period of time. By way of contrast, sorbent materials from wood pulp fibers do not have the high absorbency capacity of the Dow material, but have a greater ability to distribute the urine across the pad and achieve the evaporation of the urine. Since urine evaporation has been determined to be the key factor in odor prevention, the use of a large amount of cat litter should be avoided. While the use of no litter at all would be optimum from the standpoint of odor prevention, it is difficult to train animals to use a pad that does not have litter present. More over, the litter does have a beneficial effect in combination with solid wastes and cats will tend to not use the litter box which does not have litter when defecating. Thus, while the use of two or preferably three inches of litter is commonly recommended for litter boxes, it has now been found that the use of less than one inch and preferably from about one quarter inch to about one half inch of litter produces the optimum combination of solid waste handling characteristics, economy of material and minimum urine evaporation prevention.

The quantity of litter employed in the system is significantly less critical when the teachings of the instant invention are followed.

Sand is a well known medium for use as cat litter. The sand particles do not appear to absorb the urine, in the manner that clay and other commercial litters absorb and hold large quantities of urine. In the case of sand, the urine appears to be held by surface tension within the densely packed material. The use of typical sand, such as employed in children's sand boxes can function to retard odor formation only so long as there is a great mass of material. Thus, in the case of sand, many inches of this litter would be required. As evident from the graph of FIG. 3, the fine sand is better than an absorbent litter, from the standpoint of evaporation, but the urine tends to puddle beneath the sand in the litter box and odor forms rapidly unless large volumes of sand are used. Thus, sand is not an acceptable medium for household use as a litter in a cat litter box. The combination of fine sand with an absorbent pad does not produce an appreciable evaporation rate change over the use of the sand alone. From a evaporation standpoint it is better than the combination of an absorbent litter with an absorbent pad, but tends to be less effective than the litter-absorbent pad system. The decreased efficacy is probably due to the fact that the evaporation rate is too low to be effective. Unlike absorbent litter, the sand tends to accumulate the urine in a wet form, while, like the absorbent liter, it retards the efficacy of the absorbent pad.

Surprisingly, although fine sand does not provide the desired results, the use of a coarse sand in combination with an absorbent litter pad can produce results which initially surpass those attained with the absorbent pad by itself and long term closely approximate the results attained with an absorbent pad by itself. It should be noted that the use of the absorbent/desiccant pad by itself would appear to provide the maximum evaporation rate. It has been observed, nevertheless, that the combination of the coarse sand with the absorbent pad produces a synergistic effect, at least initially, because the coarse sand broadly distributes the urine across the absorbent pad. The exposed, upwardly disposed portion of the absorbent pad can be seen to become rapidly wet when the sand is wetted with about 300 ml. of water. By way of contrast, in the case of absorbent litter, fine sand and an absorbent pad by itself, the water is initially in a small area of only several inches in diameter. The fine sand is densely packed and consequently tends to both inhibit the travel of the urine to the absorbent pad and the evaporation from the absorbent pad. It is this evaporation inhibition which normally renders critical, the use of a minimum amount of a non-absorbent litter. Users who are accustomed to the use of three or more inches of litter must dramatically change their habit in order to achieve the desired results. By way of direct contrast, the coarse sand both widely distributes the urine and permits free evaporation. Consequently, the use of coarse sand is more forgiving, that is, there is a wider latitude in the amount of coarse sand which can be used. Nevertheless, it is preferred that the coarse sand be limited to use in a layer of about one quarter to three quarters of an inch. Because in a cat litter box, the litter is rewetted ever two to tour hours, depending upon the number of cats using the box, the diet of the cat, etc., the long term effectiveness of the odor prevention system is dependent upon the ability to remove the urine from the system. Since in an absorbent litter system, the quantity of urine retained in the system increases with time, it is evident that the system will become overwhelmed by the mass of the urine and will loose its ability to prevent odor. Thus, it should be evident that the maximumization of evaporation is critical to prolonging of the useful life of the odor preventing system.

It is noted that the use of the large pebbles, has several draw backs. As the size of the granules increase substantially above the quarter inch diameter size, particularly above one half inch in diameter, there is an increasing tendency of the cats to reject the medium, probably because of the interference with the digging instinct. Moreover, the observed evaporation rate decreases, probably due to the decreased ability to widely distribute the urine over the absorbent pad.

What is claimed is:

1. In the combination of a cat litter box, a dessicant-/absorbent member and litter, the improvement wherein said litter is substantially non-absorbent particles having an average particle size of at least sufficiently large diameter to provide sufficient interparticle spacing to permit free flow of urine from the particles to said sorbtive-desiccant member and the free flow of water vapor from said sorbtive-desiccant member into the atmosphere and wherein said non-absorbent particles are substantially free of smaller particles having a size such that said smaller particles fill the spaces between adjacent non-absorbent particles and consequently inhibit air flow between adjacent litter particles.

2. The combination of claim 1, wherein said litter is mineral particles.

3. The combination of claim 2, wherein said mineral particles have an average particle size greater than about one millimeter.

4. The combination of claim 2, wherein said mineral particles are coarse sand having an average particle size greater than about one millimeter.

5. The combination of claim 3, wherein said mineral particles have an average particle size no greater than about three centimeters.

6. The combination of claim 5, wherein said mineral particles have an average particle size in the range from about two millimeters to about one centimeter.

7. The combination of claim 4, wherein said particles have an average particle size in the range from about two millimeters to about one centimeter.

8. The combination of claim 1, wherein said particles have an average particle size in the range from about two millimeters to about one centimeter and are substantially free of friable particles.

9. The combination of claim 1, wherein said litter is substantially free of friable particles.

10. The method of preventing the odor caused by the action of bacteria on cat urine in a cat litter box having a base and walls, sorbtive-desiccant member for the collection of animal urine overlying said base, said litter being in direct moisture transfer contact with said sorbtive-desiccant member, comprising the steps of:

a. transferring cat urine directly from granular litter particles, to said sorbtive-desiccant member, said granular particles being non-absorbent particles having sufficiently large diameter to provide sufficient interparticle spacing to permit free flow of urine from the particles to said sorbtive-desiccant member and the free flow of moisture from said sorbtive-desiccant member into the atmosphere;

b. sorbing said urine in a sorbtive-desiccant member having high surface area and high urine sorbency, and dispersing the urine quickly in said sorbtive-desiccant member;

c. preventing urine from leaving one side of said sorbtive-desiccant member by having said one side of said sorbtive-desiccant member in contact with moisture impermeable means;

d. maintaining the urine in a medium which subjects the bacteria in the urine to desiccation;

e. evaporating said urine from said high surface area sorbtive-desiccant member through said litter granular particles and causing the bacteria, which are capable of breaking down cat urine, to die or become dormant thereby preventing significant odor formation.

11. An evaporation device comprising, in combination, a dessicant/absorbent member and substantially non-absorbent particles, said non-absorbent particles having an average particle size of at least sufficiently large diameter to provide sufficient interparticle spacing to permit free flow of liquid from the particles to said sorbtive-desiccant member and the free flow of vapor from said sorbtive-desiccant member to the atmosphere and wherein said non-absorbent particles are substantially free of particles having a size such that the particles fill the spaces between adjacent non-absorbent particles and consequently inhibit air or vapor flow between adjacent non-absorbent particles.

12. The device of claim 11, wherein said non-absorbent particles are mineral particles.

13. The device of claim 12, wherein said mineral particles have an average particle size greater than about one millimeter.

14. The device of claim 12, wherein said mineral particles are coarse sand having an average particle size greater than about one millimeter.

15. The device of claim 13, wherein said mineral particles have an average particle size no greater than about three centimeters.

16. The device of claim 15, wherein said mineral particles have an average particle size in the range from about two millimeters to about one centimeter.

17. The device of claim 11, wherein said particles have an average particle size in the range from about two millimeters to about one centimeter.

18. The device of claim 11, wherein said particles have an average particle size in the range from about two millimeters to about one centimeter and are substantially free of friable particles.

19. The device of claim 11, wherein said non-absorbent particles is substantially free of friable particles.

20. The method of preventing the odor caused by the action of bacteria in a nutrient liquid comprising the steps of:
 a. depositing a nutrient liquid on substantially non-absorbent granular particles;
 b. transferring said nutrient liquid directly from granular particles, to said sorbtive-desiccant member, said granular particles being non-absorbent particles having suffiently large diameter to provide sufficient interparticle spacing to permit free flow of urine from the particles to said sorbtive-desiccant member and the free flow of moisture from said sorbtive-desiccant member to the atmosphere;
 b. sorbing said nutrient liquid in a sorbtive-desiccant member having high surface area and high sorbency capacity for said nutrient liquid, and dispersing nutrient liquid quickly in said sorbtive-desiccant member;
 c. preventing said nutrient liquid from leaving one side of said sorbtive-desiccant member by having said one side of said sorbtive-desiccant member in contact with moisture impermeable means;
 d. maintaining the nutrient liquid in a medium which subjects the bacteria in the nutrient liquid urine to desiccation;
 e. evaporating said nutrient liquid from said high surface area sorbtive-desiccant member through said non-absorbent particles means and causing the bacteria, which are capable of breaking the nutrient liquid, to die or become dormant thereby preventing significant odor formation.

* * * * *